United States Patent [19]

Diperstein et al.

[11] Patent Number: 4,730,968
[45] Date of Patent: Mar. 15, 1988

[54] SELF-TAPPING, SELF-ALIGNING THREAD REPAIR INSERT

[75] Inventors: David Diperstein, 125 Buckley Rd., Glenside, Pa. 19038; Joseph D. Pagliuca, Paramus, N.J.

[73] Assignees: David Diperstein, Glenside, Pa.; Groov-Pin Corporation, Ridgefield, N.J.

[21] Appl. No.: 905,081

[22] Filed: Sep. 8, 1986

[51] Int. Cl.⁴ ............................................. F16B 37/12
[52] U.S. Cl. ................................... 411/178; 411/386
[58] Field of Search .................. 411/178, 386, 387; 10/86 R, 141 R, 140

[56] References Cited

U.S. PATENT DOCUMENTS

| 2,292,195 | 8/1942 | Brown | 411/386 |
| 2,639,179 | 5/1953 | Phelps | 411/178 |
| 2,823,574 | 2/1958 | Rosan | 411/386 |

FOREIGN PATENT DOCUMENTS 1130648  5/1962  Fed. Rep. of Germany ...... 411/178

OTHER PUBLICATIONS

"Tap-Lok (TM) Inserts" brochure by Groov-Pin Corp., copyright 1980, p. 6.
"Plastics Performers" brochure by Groov-Pin Corp.
"Whip-L Products" brochure, pp. 22-24.
"Pioneer E-Z LOK" brochure, pp. 30-31.
"Surface Hardening", pub. No. 39.04 by Crane, copyright 1965.

*Primary Examiner*—Neill Wilson
*Attorney, Agent, or Firm*—Seidel, Gonda, Goldhammer & Abbott

[57] ABSTRACT

A self-tapping, self-aligning thread repair insert is disclosed. The insert is an annular sleeve having a threaded interior surface, a partially threaded exterior surface, and an opening. The exterior surface has a tapered portion between a straight threaded portion and a straight thread-free portion. The thread-free portion and the opening are adjacent an end of the sleeve. The thread-free portion is free of threads for a distance of at least 1.5 thread widths from the end of the sleeve. The sleeve is made of a 400 series stainless steel. The sleeve is case hardened.

11 Claims, 7 Drawing Figures

U.S. Patent   Mar. 15, 1988   Sheet 1 of 2   4,730,968
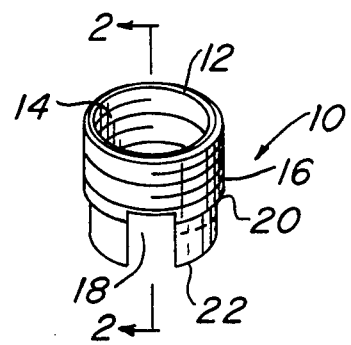
FIG. 1
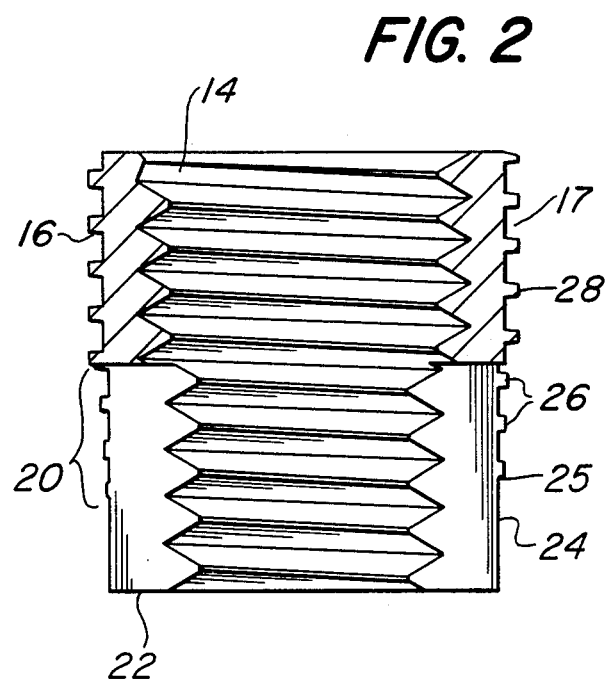
FIG. 2
FIG. 3
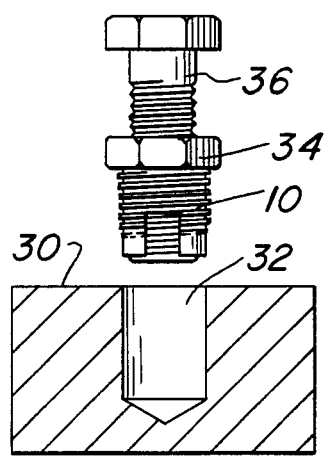
FIG. 4
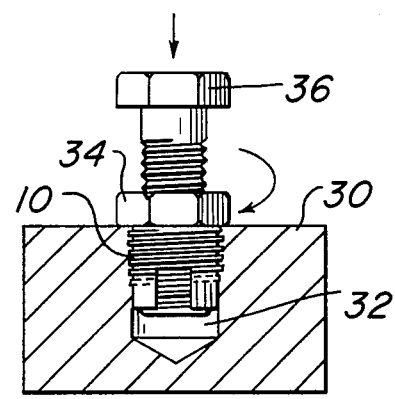

SELF-TAPPING, SELF-ALIGNING THREAD REPAIR INSERT

SCOPE OF THE INVENTION

This invention is directed to a self-tapping, self-aligning thread repair insert.

BACKGROUND OF THE INVENTION

Thread repair inserts are well known in the art. Such an insert can comprise a sleeve having threaded interior and exterior surfaces or a helical coil. For an example of the sleeve-type inserts, see the thin wall and spark plug series TAP-LOK (registered trademark) Inserts manufactured and distributed by Groov-Pin Corporation, 1125 Hendricks Causeway, Ridgefield N.J.

The insert is used to repair a threaded hole after the threads have been stripped away. Typically, the stripped hole is "drilled out" using a drill bit having a slightly larger diameter than the diameter of the original threaded hole. This completely removes the stripped threads. The insert must then be coaxially aligned with the hole. Great care must be taken when aligning the insert with the hole. If the insert is not perfectly aligned with the hole; the repair will be imperfect and must be redone. Of course, this makes the use of inserts difficult and expensive because alignment of the insert is not easily accomplished. To date, no insert has been developed which easily overcomes the alignment problem.

SUMMARY OF THE INVENTION

The present invention is directed to a self-aligning thread repair insert. The insert is an annular sleeve having a threaded interior surface, a partially threaded exterior surface, and an opening. The exterior surface has a tapered portion between a straight threaded portion and a straight thread-free portion. The thread-free portion and the opening are adjacent an end of the sleeve. The thread-free portion surface is free of threads for a distance of at least 1.5 thread widths from the end of the sleeve.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is an isometric view of an embodiment of the present invention.

FIG. 2 is an enlarged sectional view of the embodiment shown in FIG. 1 taken generally along lines 2—2.

FIG. 3 is an illustration of the first step in a method for utilizing the present invention.

FIG. 4 is an illustration of the second step in a method for utilizing the present invention.

DETAILED DESCRIPTION OF THE INVENTION

Figure 5:
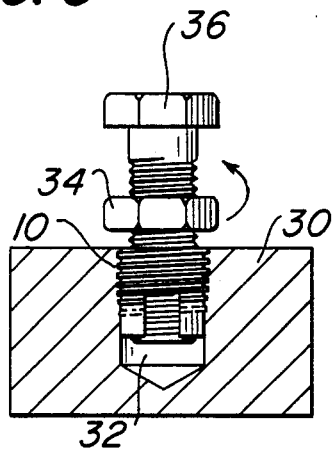
FIG. 5 is an illustration of the third step in a method for utilizing the present invention.
Figure 6:
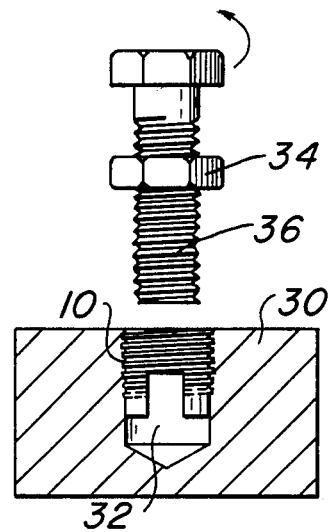
FIG. 6 is an illustration of the fourth step in a method for utilizing the present invention.

Referring to the drawings wherein like numerals indicate like elements there is shown in FIG. 1 an insert 10 made according to the present invention.

Insert 10 is an annular sleeve 12 having a threaded interior surface 14, a partially threaded exterior surface 16 and an opening 18. The exterior surface 16 has a tapered portion 20. Tapered portion 20 is located between two non-tapered or straight portions 17 and 24. Portion 17 is threaded and portion 24 is thread-free. Opening 18 is located adjacent a forward end 22 of sleeve 12.

Figure 7:
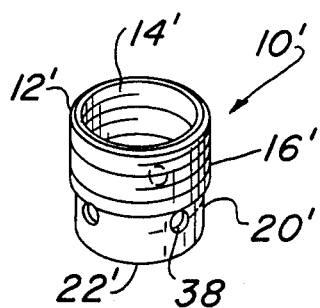
FIG. 7 is an isometric view of an alternate embodiment of the present invention.

Opening 18 forms a cutting edge which provides the tapping action of the insert. Opening 18 also allows metal shavings to be removed from the cutting edge. In FIG. 1, opening 18 is a pair of rectangular slots (only one shown) which are diametrically opposed on the sleeve 12. The slots are located adjacent the forward end 22 and are open at end 22. In FIG. 7, the opening is a plurality of holes 38. Holes 38 preferably number three, are equally spaced from forward edge 22 and are placed at equal intervals (120°) about the sleeve 12.

Preferably, insert 10 is made of a 400 series stainless steel. Preferably, the insert is case hardened, i.e. only the surface is hardened and the interior remains soft. The case hardened surface should preferably have a Rockwell hardness of at least 40. Case hardening prevents the insert from shattering while it is tapped. Preferably, case hardening of the insert is performed according to the following steps:

1. Preheat at about 1500° F. for approximately 30 minutes;
2. Neutral harden at about 1850° F. for approximately 1.5 hours;
3. Oil quench and wash;
4. Freeze at about −150° F. for approximately 2 hours; and
5. Temper at about 300° F. for approximately 3 hours.

Preferably the inserts are made of 416 stainless steel. The material of construction is important in that it improves the corrosion resistance of the insert.

Referring to FIG. 2, external threads 28 are truncated. The external threads preferably have a pitch of 60°. These truncated threads reduce the torque necessary to turn the insert into the uncut metal. The tapered portion 20 extends from the uppermost edge 25 of a thread-free straight surface 24 to approximately the top of opening 18. Of course, the tapered portion 20 is not limited to that distance.

The thread-free straight surface 24 is immediately adjacent edge 22. The surface 24 extends at least 1.5 thread widths from the edge 22. Surface 24 is crucial to the self-aligning feature of the present invention. The longer the thread-free straight surface 24; the better the self-aligning feature. Threads 26 in the tapered portion 20 of sleeve 12 are also tapered. Tapered portion 20 acts as a guide to align and center the insert.

Referring to FIGS. 3–6, a method of utilizing the present invention is disclosed. A block 30 has a drilled out bore 32. Block 30 can be a machine or engine block and can be made of any material including cast iron and aluminum. The bore preferably should have a depth slightly greater than the length of insert 10. Bolt 36 having a nut 34 threaded thereon is threaded into insert 10. Bolt 36 with nut 34 and insert 10 is place above bore 32. The thread-free straight surface 24 will self-align and center insert 10 and bolt 36 with bore 32 as it is pressed into bore 32. To ensure that insert 10 is aligned and centered within bore 32 downward pressure should be placed on bolt 36 using a socket wrench (not shown). Tighten nut against insert. Insert 10 is threaded into bore 32 by turning the bolt 36. Insert 10 is fully installed when nut 34 has bottomed against block 30. Nut 34 should be backed off insert 10 and block 30 while holding bolt 36 still. The repair is complete after the bolt 36 and nut 34 have been removed from insert 10.

The present invention may be embodied in other specific forms without departing from the spirit or essential attributes thereof and, accordingly, reference should be made to the appended claims, rather than to the foregoing specification, as indicating the scope of the invention.

We claim:

1. A self-aligning thread insert comprises:
   an annular sleeve having a wall and a threaded interior surface, a partially threaded exterior surface, and a radial opening through said sleeve wall;
   said exterior surface having a tapered threaded portion between a straight threaded portion and a straight non-tapered thread-free portion, said opening extending axially through said tapered threaded portion to provide a cutting means;
   said thread-free portion and said opening being adjacent an end of said sleeve;
   said thread-free portion being free of threads for a distance of at least 1.5 thread widths from said end of said sleeve and engaging and aligning said sleeve in a bore.

2. The insert according to claim 1 wherein said opening is a pair of rectangular slots diametrically opposed on said sleeve.

3. The insert according to claim 1 wherein said opening is a plurality of holes equally spaced from said end of said sleeve and equally spaced about said sleeve.

4. The insert according to claim 1 wherein said sleeve is made of a 400 series stainless steel.

5. The insert according to claim 1 wherein said sleeve is case hardened.

6. The insert according to claim 5 wherein said case hardened sleeve has a Rockwell hardness of at least 40.

7. The insert according to claim 1 wherein said threads on said exterior surface are truncated.

8. A self-aligning thread insert comprises:
   a sleeve having a wall and a threaded interior surface, a straight threaded exterior surface, a tapered exterior threaded surface and a straight non-tapered thread-free surface;
   said tapered exterior being located between said threaded and said thread-free portions, and said thread-free portions being adjacent an end of said sleeve and having a length of at least 1.5 thread widths and engaging and aligning said sleeve in a bore; and
   a cutting means being a radial opening through said sleeve wall and located through the tapered surface.

9. The insert according to claim 8 wherein said cutting means is a pair of rectangular slots diametrically opposed on said sleeve.

10. The insert according to claim 8 wherein said cutting means is a plurality of holes equally spaced from said end of said sleeve and equally spaced about said sleeve.

11. The insert according to claim 8 wherein said sleeve is case hardened.

* * * * *